United States Patent Office 3,316,336
Patented Apr. 25, 1967

3,316,336
PROCESS FOR PREPARING COMPOSITE
FILAMENTARY ARTICLES
Cornelius P. Smith, Midland, Mich., assignor to The Dow Chemical Company, Midland, Mich., a corporation of Delaware
No Drawing. Filed Dec. 5, 1963, Ser. No. 328,178
5 Claims. (Cl. 264—171)

This invention relates to filamentary articles, such as textile fibers, which are characterized by a central core encompassed by an adherent sheath of a dissimilar polymer. The invention is particularly concerned with an improved process whereby such filamentary articles are prepared.

In the fabrication of useful articles of commerce, it is frequently found that no single structural or construction material will provide optimum properties and characteristics to satisfy all the requirements and specifications of the article. This is particularly true in the plastics art. Many polymers have generally good fiber-forming properties but are lacking in one or more essentials to make them commercially attractive for synthetic, man-made fibers. For example, many polymers, such as the normally crystalline polymers and copolymers of vinylidene chloride, will form fibers of adequate strength, abrasion resistance, elongation, launderability, hand, and the like, but are not easily dyed by conventional techniques. Other polymers, such as cellulose acetate, are dyeable but are deficient in some other property. In the plastics art, it is commonplace to coat, laminate, formulate, or otherwise utilize the strong properties of each of two or more plastic materials to approach an optimum community of properties. The fiber and filament arts are no exception in this desire to achieve products of ever improved properties. However, the attainment of such improvements in fibers and filaments by the aforementioned means is complicated by the unique dimensions of those articles making them, especially in the formulative stage, relatively weak and thus difficult to handle as individual strands. Their size dictates their preparation and use in tows or other aggregates on numerous individual fibers to attain adequate strength. In such aggregate form, it is difficult to use the conventional techniques of coating or lamination. It would be helpful and desirable to be able to combine the good properties of each of two or more polymeric materials, such as the previously referred to normally crystalline polymers and copolymers of vinylidene chloride and cellulose acetate, to arrive at a composite filamentary article of improved overall properties.

In U.S. 2,880,056, issued March 31, 1959, to Carr et al., there is described a process whereby an electrolyte solution of a polymer is spun into an aqueous latex of another polymer to produce a coated filamentary article. However, electrolytes are difficult to extract from the resultant fiber and when left in the article, even in trace amounts, are frequently detrimental.

In view of the above, it is the primary object of this invention to provide a composite filamentary article composed of a core of one material and an adherent encompassing sheath of a dissimilar material.

It is a further object of the invention to provide a process for preparing such fibers.

The above and related objects are achieved by means of a process for preparing such composite, filamentary articles, the said process comprising the continuous contacting in fiber-forming relationship of (1) a water-coagulable solution of a first water-insoluble fiber-forming polymeric material dissolved in a liquid, organic solvent for said first fiber-forming material with (2) an aqueous latex of a second fiber-forming polymeric material, said latex being coagulable by, and not being insoluble in, said liquid organic solvent to form a coaxial filamentary coagulum having one of said polymeric materials as the core and the other as the sheath, then continuously withdrawing said filamentary coagulum from the point at which it is formed at the same rate at which it is formed, then washing said filamentary coagulum, drying said filamentary coagulum under conditions so that any of said liquid solvent is caused to diffuse through said sheath, and finally fusing said filamentary coagulum into the coated filamentary article.

The invention further comprehends a composite filamentary article consisting of a continuous core of a first fiber-forming polymeric material with an adherent encompassing sheath of a second polymeric material.

The spinning dope of the first fiber-forming polymeric material is a solution of any fiber-forming polymer dissolved in fiber-forming concentration in a suitable solvent. The minimum concentration need only be high enough to form a continuous coagulum. Usually, this will be in the order of about 10 percent by weight of solute of the fiber-forming polymer. The upper limit of concentration is determined by the solubility of the polymer in the solvent. The identity of the polymer will determine in large measure the useful solvents. Thus, cellulose acetate is soluble in fiber-forming amounts in acetone. Polyacrylonitrile and the fiber-forming acrylonitrile copolymers are soluble in dimethylformamide. Combinations of polymers and solvents to make useful spinning dopes will be well known or can be determined by simple preliminary experiments. The useful first fiber-forming polymeric materials may be selected from a wide variety of such materials. Typical examples include: cellulose acetate, polyacrylonitrile and acrylonitrile copolymers, polyesters, viscose rayon, and vinyl chloride and vinylidene chloride copolymers. Other choices may be made by reference to the tabulations of properties in standard reference works.

The spinning dope of the first fiber-forming polymeric material may contain dyes, dye-assistans, and other functional additives commonly incorporated into spinning dopes. Any such additives must be insoluble in water so as not to be leached out by the aqueous latex bath.

The aqueous latex of the second fiber-forming polymeric material may be of any synthetic resinous polymeric material including typically the polymers and copolmers obtainable from the emulsion polymerization of one or more of styrene and its homologs and analogs, vinyl halides, such as vinyl chloride; vinylidene halides, such as vinylidene chloride; vinyl alkanoates, such as vinyl acetate; open-chain aliphatic conjugated dienes, such as butadiene; alkyl, aralkyl, cycloalkyl, and aryl acrylates and alkacrylates, such as methyl acrylate, cyclohexyl acrylate, phenyl acrylate and methyl methacrylate. Also latexes of condesation polymers including, for example, the polyamides, such as nylon, and the polyesters, such as polyethylene terephthlates, are operable. Latexes of polyolefins, such as polyethylene and polypropylene, likewise find utility in the invention. By the term "latex" is meant a colloidal dispersion of the polymeric material in an aqueous continuous phase. Some such latexes are prepared directly by emulsion polymerization. Others are prepared by the dispersal of the finely divided polymer in water. Such latexes are commercially available or may be made by known procedures.

The latex of the second fiber-forming polymeric material must be film- or fiber-forming. By that is meant that the polymeric material should be deposited in a coagulum which will form a continuous film upon air drying or will do so when subjected to elevated temperatures. As is known in the latex art, to secure a continuous article, the latex should have at least about 20 percent by weight polymer solids. For use in this invention, the latex should be coagulable by the solvent of the spinning dope. Most latexes are coagulated by organic solvents.

The process of the present invention involves contacting the spinning dope with an aqueous latex whereby each is coagulated by the continuous phase of the other to form a composite coagulum of the polymer of the spinning dope encompassed by that of the latex. A convenient technique for so mutually contacting the two fiber-forming media is to express the spinning dope through a small orifice or spinneret into a bath of the latex. The continuous coagulum is continuously withdrawn from the site of its formation at the rate at which it is formed. The coagulum then is usually washed and dried to remove water-soluble materials not desired in the final product. The drying is carried out at temperatures and rates so that any solvent entrapped in the core portion will diffuse out before the sheath is completely fused. The resultant composite filament will demonstrate properties that are the complement of those of each of the polymers making up the filament.

By way of example, a spinning dope of cellulose acetate in acetone at room temperature was expressed through a small orifice into a bath of a latex of a copolymer of 97 percent vinylidene chloride and 3 percent acrylonitrile. The acetone in the spinning dope coagulated the latex and the water in the latex coagulated the spinning dope. The so-formed coagulum was removed from the site of formation, drawn through a water bath until the acetone was substantially completely removed, and then dried at room temperature for 24 hours. After that, the fiber was exposed to an elevated temperature for a short period to complete the fusion of the latex. The resulting filamentary article was flexible, strong, and had otherwise useful filamentary properties, was readily dyeable with acetate dyestuffs, and had outstanding wet strength.

What is claimed is:

1. A process for preparing coated filamentary articles comprising (A) the wet solvent spinning of a spinning dope consisting essentially of a water-coagulable solution of (1) a first water-insoluble fiber forming polymeric material and (2) a liquid organic solvent for said fiber-forming polymeric material into a bath of an aqueous latex of a second synthetic resinous fiber-forming material dissimilar to said first fiber-forming polymeric material, said latex being coagulable by and said second synthetic resinous fiber-forming material being insoluble in said liquid organic solvent to form a coaxial filamentary coagulum having said first fiber-forming polymeric material as the core and said second synthetic resinous fiber-forming material as the sheath; (B) continuously withdrawing said filamentary coagulum from the point at which it is formed at the same rate at which it is formed; (C) washing said filamentary coagulum; (D) drying said filamentary coagulum under conditions that any of said liquid solvent is caused to diffuse through said sheath; and (E) fusing said filamentary coagulum into the coated filamentary article.

2. The process claimed in claim 1 wherein said water-coagulable solution is an acetone solution of cellulose acetate.

3. The process claimed in claim 1 wherein said aqueous latex is the emulsion polymerizate of a normally crystalline vinylidene chloride polymer.

4. The process claimed in claim 3 wherein said normally crystalline vinylidene chloride polymer is a copolymer of vinylidene chloride and acrylonitrile.

5. The process claimed in claim 3 wherein said normally crystalline vinylidene chloride polymer is a copolymer of vinylidene chloride and an alkyl acrylate having from 1 to 4 carbon atoms in the alkl group.

References Cited by the Examiner
UNITED STATES PATENTS

| | | | |
|---|---|---|---|
| 1,713,679 | 5/1929 | Snelling | 264—314 XR |
| 1,920,564 | 8/1933 | Jochum et al. | 264—185 |
| 2,347,525 | 4/1944 | Thinius | 264—184 XR |
| 2,351,090 | 8/1944 | Alles | 264—171 XR |
| 2,708,617 | 5/1955 | Magat et al. | 264—184 |
| 2,737,436 | 3/1956 | Boeuf | 264—290 XR |
| 2,880,056 | 3/1959 | Carr et al. | 264—168 |
| 2,914,376 | 11/1959 | Bibolet et al. | 264—184 |
| 3,051,545 | 8/1962 | Steuber | 264—182 |
| 3,068,527 | 12/1962 | Morgan | 264—184 XR |

ALEXANDER H. BRODMERKEL, *Primary Examiner.*

J. H. WOO, *Assistant Examiner.*